United States Patent [19]

Jones

[11] Patent Number: 4,614,137

[45] Date of Patent: Sep. 30, 1986

[54] MAGNETIC TOOL CHANGER

[75] Inventor: Everett E. Jones, Wichita, Kans.

[73] Assignee: The Boeing Company, Seattle, Wash.

[21] Appl. No.: 513,631

[22] Filed: Jul. 14, 1983

[51] Int. Cl.$^4$ .............................................. B23B 13/02
[52] U.S. Cl. ...................................... 82/205; 279/1 A;
                                                 279/1 ME; 173/163
[58] Field of Search .................... 192/21.5, 84; 82/2.5;
                                          279/1 M, 1 ME, 1 A; 173/164, 163

[56] References Cited

U.S. PATENT DOCUMENTS

| | | | |
|---|---|---|---|
| 2,883,197 | 4/1959 | Gotha | 279/1 M |
| 3,231,968 | 2/1966 | Swanson | 29/713 |
| 3,257,876 | 6/1966 | Weidover | 279/1 M |
| 3,368,265 | 2/1968 | Kirkham | 29/713 |
| 3,927,583 | 12/1975 | Parsols | 279/1 ME |

FOREIGN PATENT DOCUMENTS 724277  3/1980  U.S.S.R. .............................. 279/1 M

Primary Examiner—E. R. Kazenske
Assistant Examiner—Willmon Fridie Jr.
Attorney, Agent, or Firm—Edwin H. Crabtree

[57] ABSTRACT

A magnetic machine tool changer and driver for electro-magnetically holding and driving a cutting tool when working on a work piece. The changer and driver further including a transfer mechanism for removing the cutting tool by electro-magnetic means.

4 Claims, 5 Drawing Figures

MAGNETIC TOOL CHANGER

BACKGROUND OF THE INVENTION

This invention relates to a magnetic tool changer and more particularly but not by way of limitation to a magnetic tool changer and driver for electro-magnetically holding and driving a cutting tool when working on a work piece.

Heretofore, automatic machine tools have used mechanically held cutting tool adapters. The cutting tool on the adapter is exchanged by stopping the spindle which drives the cutting tool and the cutting tool is then manually removed or replaced. Also, there are automatic tool changing tool mechanisms which are designed with mechanical holding devices to restrain the adapter and tool in the quill of the machine.

In U.S. Pat. No. 2,759,580 To Bower, U.S. Pat. No. 2,828,132 to MacFarlane, U.S. Pat. No. 2,914,155 to Bower German Pat. No. 904,972 to Walter Seegers et al and German Pat. No. 949,316 to Closset et al there is no disclosure or teaching of the unique features and advantages of the subject magnetic machine tool changer and driver as described herein.

SUMMARY OF THE INVENTION

The subject invention permits a cutting tool to be exchanged while the drive spindle is turning. The electro-magnetic field is used to exchange the tool adapter. Also the electro-magnetic field is used to drive the tool adapter on the power driven spindle when cutting the work piece. The tool adapter can be driven in a vertical position or any other angle desired.

The invention can be used with manual or with automatic transfer machine tools.

Further, the magnetic machine tool changer and driver includes a transfer mechanism which can automatically transfer the tool adapter with cutting tool for installing a new cutting tool.

The magnetic machine tool changer and driver for electro-magnetically holding and driving a cutting tool when working on a work piece includes a drive motor assembly with drive spindle having an electro-magnetic field which can be energized and de-energized. An armature plate is mounted on top of the field and centered thereon. A tool adapter includes a tool chuck adapted for holding the cutting tool. The tool adapter is secured to the top of the armature plate and centered thereon when electro-magnetic field is energized.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
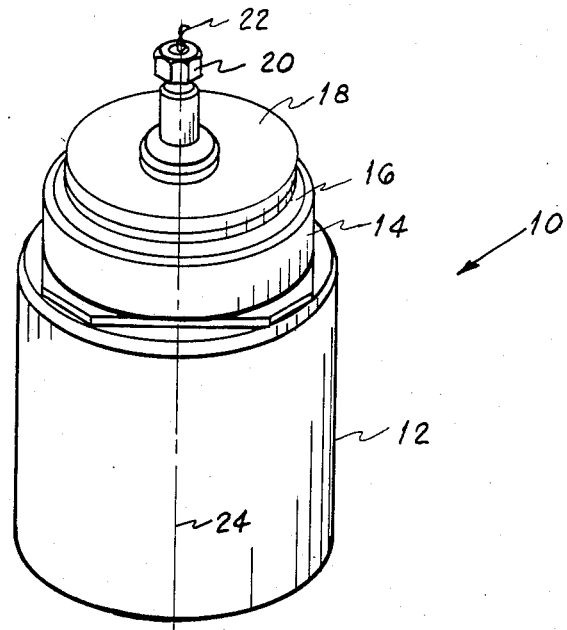
In FIG. 1 a perspective view of the drive motor assembly with armature plate and tool adapter is illustrated.
Figure 2:
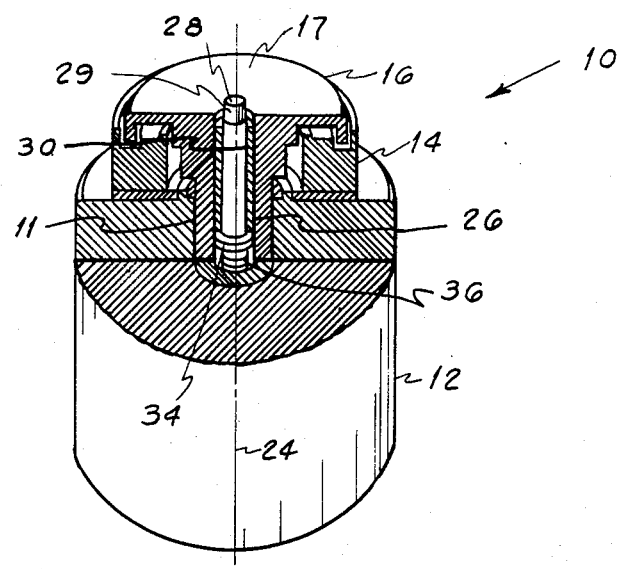
FIG. 2 illustrates a perspective view of the drive motor assembly and armature plate with a portion of the armature plate and assembly cut-away.

In FIG. 1 a perspective view of the magnetic machine tool changer and driver is shown and designated by general reference numeral 10. The driver 10 includes a drive motor assembly 12 with rotating spindle 11 and having an electro-magnetic member 14 mounted on the top thereof which is used to produce an electro-magnetic field to energize and de-energize an armature plate 16 which is part of the spindle 11. The spindle 11 is shown in FIG. 2. When the electro-magnetic member 14 is energized the top face 17 of the armature plate 16 which is annular in shape receives and secures a tool adapter 18 on the top thereof. The tool adapter 18 includes a tool chuck 20 for receiving and engaging a cutting tool 22.

In FIG. 2 the upper portion of the drive motor assembly 12 is cut-away to expose a portion of the spindle 11, the electro-magnetic member 14 and the armature plate 16. Extending along a center line 24 of the assembly 12 is a bore 26 for receiving an elongated pin 28 inside a sleeve 30. A top 29 of the pin 28 is tapered and extends upwardly from the top face 17 of the armature plate 16 for receipt in a tapered hole 32 in the bottom of the tool adapter 18.

The elongated pin 28 is received on top of a stop flange 34 mounted on top of a coil spring 36. When the electro-magnetic member 14 is energized an annular base plate 19 of the tool adapter 18 is received around the annular top face 17 of the armature 16 with the tapered end of the pin 20 received in the tapered hole 32 thereby centering the tool adapter 18 on top of the armature plate 16. At this time the pin 28 is biased downwardly against the top of the spring 36.

Figure 3:
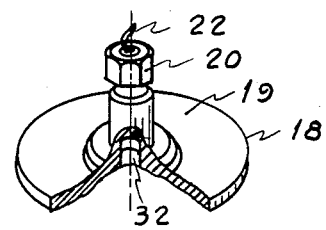
FIG. 3 illustrates a portion of the tool adapter cut-away.

FIG. 3 illustrates the tool adapter 18 with the annular base plate 19 positioned above the top of the drive motor assembly 12 and along the center line 24.

Figure 4:
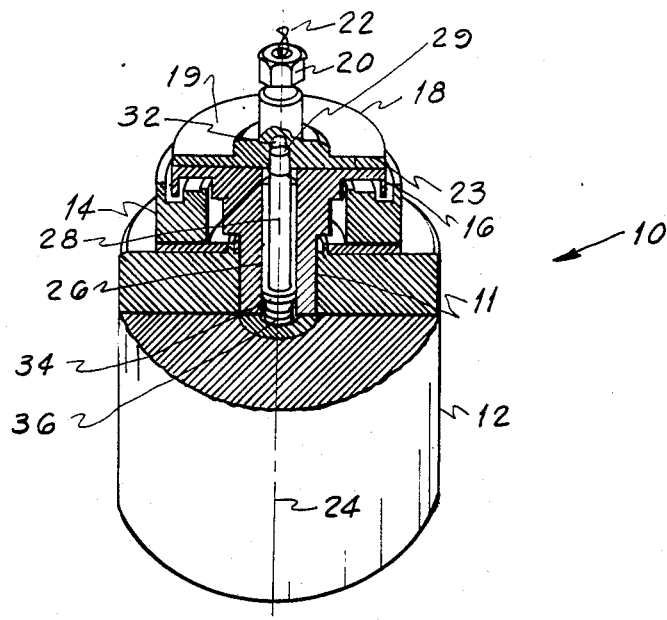
FIG. 4 illustrates the tool adapter secured to the top of the armature plate with a portion of the tool adapter, armature plate and drive motor assembly cut-away.

FIG. 4 illustrates the electro-magnetic member 14 energized and receiving the tool adapter 18 on top of the armature plate 16 with the top 29 of the pin 28 received inside the tapered hole 32 of the tool adapter plate 18. At this time, the pin 28 is forced downwardly compressing the coil spring 36. In this position the drive motor assembly 12, not only holds but drives the tool adapter 18 with cutting tool 22 for engaging the work piece.

Figure 5:
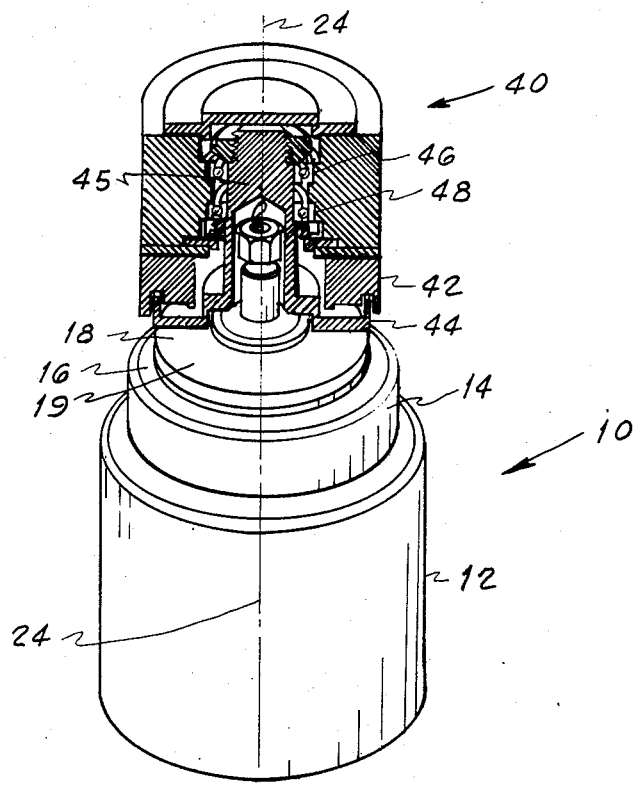
FIG. 5 illustrates the transfer mechanism received on top of the tool adapter with a portion of the transfer mechanism cut-away.

In FIG. 5 a transfer mechanism designated by general reference numeral 40 is shown and aligned along center line 24. The transfer mechanism 40 includes an electro-magnetic member 42 to produce an electro-magnetic field which can be energized and de-energized and an armature plate 44 which is received on top of the annular base plate 19. The armature plate 44 is part of a freely rotating spindle 45. When the tool adapter 18 is transferred while the spindle 11 of the drive motor assembly 12 is still turning, the armature plate 44 of the transfer mechanism begins turning on ball bearings 46 and 48. The free running transfer mechanism 40 slows to a stop in storage.

When the tool adapter 18 is transferred from the transfer mechanism 40, the process is reversed and the electro-magnetic member 42 is de-energized and the electro-magnetic member 14 of the assembly 12 is energized. The tool adapter 18 is then transferred to the armature plate 16 and the process is repeated as described under FIG. 4.

Changes may be made in the construction and arrangement of the parts or elements of the embodiments as described herein without departing from the spirit or scope of the invention defined in the following claims.

What is claimed is:

1. A magnetic machine tool changer and driver for electro-magnetically holding and driving a cutting tool, the tool driver assembly comprising:

a drive motor having a rotating spindle therein;

an electro-magnetic member for producing an electro-magnetic field which can be energized and de-energized and being mounted concentrically about the spindle; an armature plate secured to the spindle; the armature plate mounted on top of the electro-magnetic member and centered thereon;

a spring biased pin received on top of a coil spring in the bottom of a bore through the center of the armature plate and spindle, the top of the pin extending upwardly from the top surface of the armature plate; and a removable tool adapter having a tool chuck adapted for holding the cutting tool, the tool adapter secured to the top of the armature plate when the electro-magnetic member is energized, the bottom of the tool adapter having a hole therein for receiving the top of the pin when the tool adapter is secured to the top of the armature and centered thereon, the bottom of the pin compressing the coil spring downwardly in the bore when the electro-magnetic member is energized, when the field is de-energized the pin is urged upwardly by the spring for aiding in the release of the removable tool adapter from the top of the armature plate.

2. The tool adapter as described in claim 1 further including a transfer mechanism having a second electro-magnetic member, the transfer mechanism adapted for receipt over the top of the tool adapter, when the electro-magnetic member of the driver assembly is de-energized and the electro-magnetic member of the transfer mechanism is energized, the tool adapter is secured to the transfer mechanism for removing the cutting tool from the drive motor assembly.

3. The tool adapter as described in claim 2 further including a rotatably mounted armature plate attached to the electro-magnetic member of the transfer mechanism, the armature plate engaging the top of the tool adapter when the cutting tool is transferred.

4. A magnetic machine tool changer and driver for electro-magnetically holding and driving a cutting tool, the tool driver assembly comprising:

a drive motor having a rotating spindle therein;

an electro-magnetic member for producing an electro-magnetic field which can be energized and de-energized and being mounted concentrically about the spindle; a first armature plate secured to the spindle; said first armature plate mounted on top of the electro-magnetic member centered thereon;

a spring biased pin received on top of a coil spring in the bottom of a bore through the center of the armature plate and electro-magnetic member, the top of the pin extending upwardly from the top surface of the armature plate;

a removable tool adapter having a tool chuck adapted for holding the cutting tool, the tool adapter secured to the top of the first armature plate when the electro-magnetic member is energized, the bottom of the tool adapter having a hole therein for receiving the top of the pin when the tool adapter is secured to the top of the first armature plate and centered thereon, the bottom of the pin compressing the coil spring downwardly in the bore when the electro-magnetic member is energized, when the electro-magnetic member field is de-energized the pin is urged upwardly by the spring for aiding in the release of the removable tool adapter from the top of the first armature plate;

a transfer mechanism having a second electro-magnetic member which can be energized and de-energized, the transfer mechanism adapted for receipt over the top of the tool adapter; and a second armature plate attached to the second electro-magnetic member of the transfer mechanism, the second armature plate engaging the top of the tool adapter when the first electro-magnetic member of the drive motor assembly is de-energized and the second electro-magnetic member of the transfer mechanism is energized.

* * * * *